(12) United States Patent
May

(10) Patent No.: US 7,006,909 B1
(45) Date of Patent: Feb. 28, 2006

(54) ENGINE DELAY COMPENSATION

(75) Inventor: Andrew May, Wauwatosa, WI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/969,143

(22) Filed: Oct. 20, 2004

(51) Int. Cl.
*F02D 41/14* (2006.01)

(52) U.S. Cl. .................................. 701/102

(58) Field of Classification Search .............. 701/102, 701/101, 115; 123/480; 700/72
See application file for complete search history.

(56) References Cited

U.S. PATENT DOCUMENTS

| | | | |
|---|---|---|---|
| 4,862,851 A | 9/1989 | Washino et al. | |
| 5,335,643 A | 8/1994 | Abate et al. | |
| 6,233,922 B1 * | 5/2001 | Maloney | 701/109 |
| 6,244,243 B1 * | 6/2001 | Mamiya et al. | 123/486 |
| 6,564,141 B1 | 5/2003 | Weisman | |

FOREIGN PATENT DOCUMENTS

| | | | |
|---|---|---|---|
| FR | 2 749 350 A1 | * | 12/1997 |
| JP | 60-125741 | | 7/1985 |
| WO | WO 97/47868 | * | 12/1997 |

* cited by examiner

*Primary Examiner*—Hieu T. Vo
(74) *Attorney, Agent, or Firm*—Brooks Kushman P.C.

(57) ABSTRACT

An engine with inertial integration and delay is controlled through the use of a disturbance estimator. Control logic includes a feed-forward control path driving a control input with a control signal. The feed-forward control path is designed to provide closed-loop control of the controlled parameter without the presence of transport delay. The disturbance estimator generates an estimate of the engine disturbance. A Smith predictor generates a compensation signal for the feed-forward control path based on the control signal and the engine disturbance estimate.

16 Claims, 8 Drawing Sheets

ENGINE DELAY COMPENSATION

TECHNICAL FIELD

The present invention relates to controlling internal combustion engines with inherent transport delay.

BACKGROUND ART

Internal combustion engines may have many parameters which must or may be controlled, including spark timing, fuel delivery, air intake, exhaust removal, emissions control, engine speed and torque, accessory control, and the like. Typically, the rotating mass of an engine has substantial inertia which inhibits immediate attempts to change engine parameters. This inertia is represented by integration when modeling the engine parameters.

The control problem is complicated by the presence of delay between when an engine parameter changes and when the corresponding change in a controlling signal occurs. Such delay may be caused by the response time of a sensor detecting the engine parameter, by computational time required to calculate the control signal, and by the response time of an actuator designed to affect the engine parameter. For example, the delay between when a control signal reaches a fuel injector and when the commanded amount of fuel enters the combustion chamber may be a significant factor in the fuel delivery controller design. Even if sensor, computational and actuator delays can be effectively eliminated, the engine itself may introduce delays. For example, piston engines produce discontinuous combustion at discrete points, limiting to specific ranges within each ignition cycle when control events may occur. Regardless of the cause, transport delays may result in over control and instability.

Another factor complicating the problem of engine control is the presence of disturbances in the engine. Disturbances may be any unwanted factor that influences the engine operation. Disturbances may be random, such as electrical noise picked up by sensors used to monitor engine parameters. Disturbances may also be dependent on engine operation, such as frictional losses or vibrations.

A typical model for a control system replaces the one or more engine parameters to be controlled with a linear model having an output for each controlled parameter and a corresponding input providing control signals. A controller, placed before the engine model in the control feed-forward path, provides the control signals. The input to the controller is one or more error signals found as the difference between desired levels for the controlled engine parameters and the actual engine parameter outputs fed back to the controller input. Disturbances are often modeled as an additive signal source in the feed-forward path after the controller.

One well known technique for delay compensation is to place a Smith compensator in an inner negative feedback loop around the controller. The Smith compensator or predictor feeds back a simulated engine parameter output to cancel the true engine parameter output and then adds a simulated engine parameter output without the transport delay. If the simulated engine parameter model and the delay value match the actual engine, the Smith compensator will precisely cancel the effects of the delay. However, for a controlled engine parameter subject to inertia, inaccuracies in the simulated engine model may result in saturation errors and the inability to achieve the desired engine parameter values.

Other techniques, such as the closed loop observer in a state-space controller topology, have also been proposed. However, these techniques tend to be complex and are sensitive to the closed loop observer gains.

What is needed is to control an engine with transport delay in a manner that compensates for delay without a substantial increase in complexity, without the need to accurately model engine parameters, and without the possibility of error saturation.

DISCLOSURE OF INVENTION

The present invention provides for control of an engine with inertial integration and delay through the use of a disturbance estimator.

A control system for controlling an engine with transport delay is provided. The engine has a control input and a controlled output and is subject to a disturbance. At least one sensor generates sensor signals from which the controlled output is delivered. At least one actuator receives control signals for affecting the controlled output. Control logic receives the sensor signals; estimates the disturbance based on the received sensor signals; generates a compensating signal based on a model for the engine and on the estimated disturbance; and generates the control signals based on the compensating signal, sensor signals and a desired input.

In an embodiment of the present invention, the engine model is implemented in a Smith predictor.

In another embodiment of the present invention, the control logic generates the disturbance estimate based on an error signal found as a difference between the desired input and a combination of the controlled output and the engine model output.

A method for controlling an engine with transport delay is also provided. A control signal, generated for the engine control input, is determined for controlling the engine as if the engine was without the delay. The control signal is based on an error signal. The disturbance is estimated. A compensating signal is generated based on a model for the engine and on the estimated disturbance. The error signal is generated as a difference between a desired input and a sum of the controlled output and the compensation signal.

In an embodiment of the present invention, generating a compensating signal includes generating a disturbance corrected signal by subtracting the estimated disturbance from the control signal and generating the compensating signal by passing the disturbance corrected signal through an engine model for the engine. The engine model may include a Smith predictor.

In another embodiment of the present invention, generating a control signal comprises an integral calculation. The disturbance may then be estimated based on the integral calculation.

A control system for controlling an engine with a disturbance is also provided. A Smith predictor generates a compensating signal based on an engine control input corrected for the disturbance. A disturbance estimator generates an estimate of the disturbance based on the compensating signal.

An internal combustion engine with transport delay is also provided. A feed-forward control path drives a control input with a control signal. The feed-forward control path is designed to provide closed-loop control of the controlled parameter without the presence of transport delay. A disturbance estimator generates an estimate of the engine disturbance. A Smith predictor generating a compensation signal based on the control signal and the engine disturbance estimate. The compensation signal provides an input to the feed-forward control path.

BEST MODE FOR CARRYING OUT THE INVENTION

Figure 1:
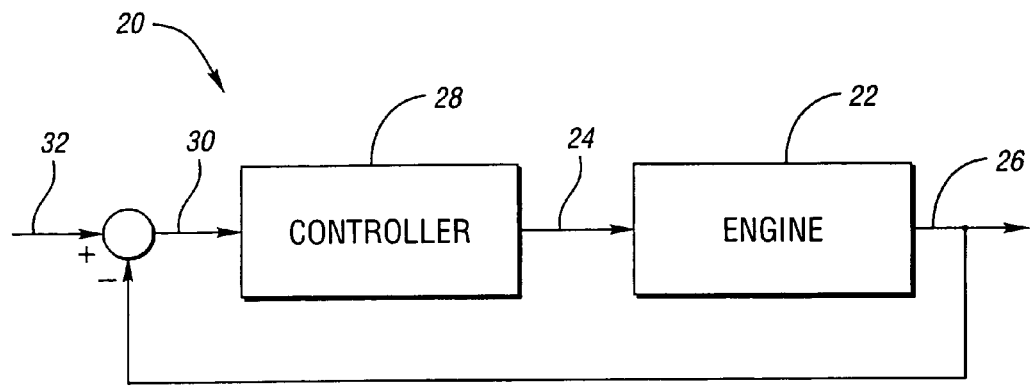
FIG. 1 is a block diagram of a prior art engine control system.

Referring to FIG. 1, a block diagram of a prior art engine control system is shown. An engine control system, shown generally by 20, includes one or more engine parameters to be controlled, represented by block 22. Engine parameters 22 have at least one control input 24 for modifying parameters 22 resulting in one or more controlled outputs 26. Without loss of generality, the remainder of this discussion will assume a single engine parameter 22 generating a single controlled output 26 based on a single control input 24. It will be recognized by one of ordinary skill in the art that the present invention is equally applicable to multiple parameters 22 with multiple control inputs 24 and controlled outputs 26.

Controller 28 generates control input 24 based on error signal 30. Error signal 30 is calculated as the difference between desired input 32 and controlled output 26. Closed-loop controller 28 is designed to control how controlled output 26 tracks desired input 32.

Figure 2:
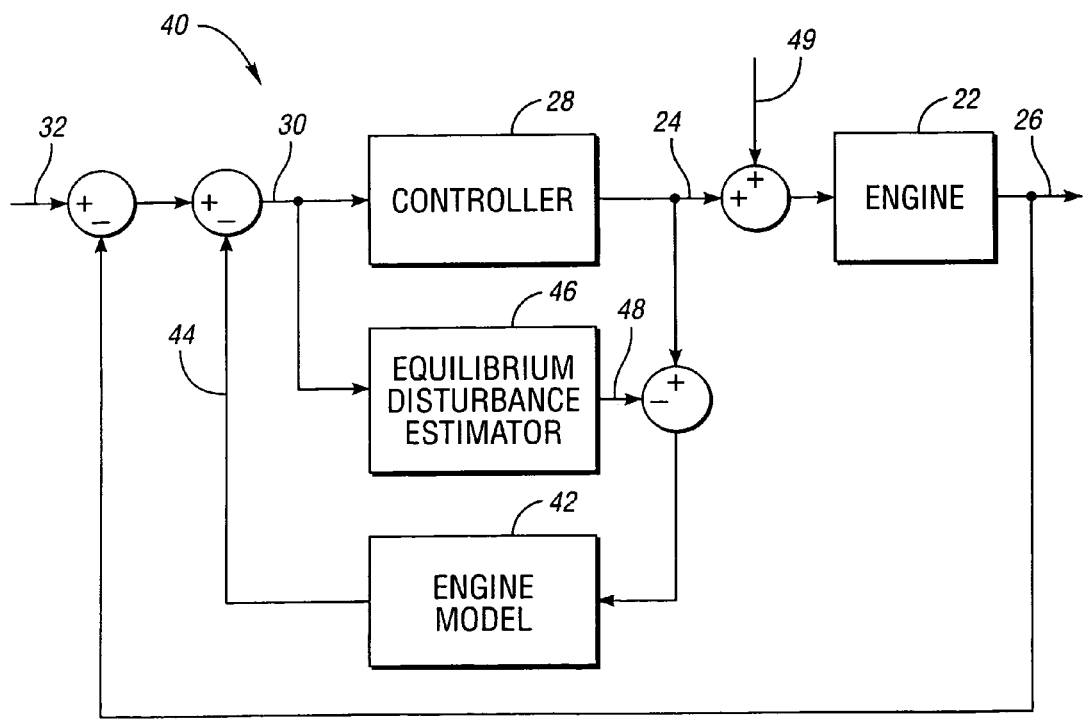
FIG. 2 is a block diagram of an engine control system according to an embodiment of the present invention.

Referring now to FIG. 2, a block diagram of an engine control system according to an embodiment of the present invention is shown. The engine control system, shown generally by 40, includes engine model 42 in a negative feedback loop around controller 28. Engine model 42 generates compensation signal 44 which, together with output 26, is subtracted from desired input 32 to generate error signal 30. Engine model 42 may be a Smith compensator as is known in the art. Other types of engine models 42 are possible, including heuristic models, deterministic models, fuzzy logic models, neural network models, and the like. Engine model 42 generates compensating signal 44 which, under ideal conditions, compensates for delay in engine 22.

Engine control system 40 also includes equilibrium disturbance estimator 46 which generates disturbance estimate 48 based on error signal 30. Disturbance estimate 48 compensates for the steady-state effects of disturbance inputs that may be mathematically expressed as additional signals summed with control input 24, shown here as disturbance input 49. Disturbances may arise from cross-parameters within engine 22 or control system 40, from external noise coupled onto control input 24, and the like. The input to engine model 42 is the difference between control input 24 and disturbance estimate 48.

In one embodiment of the present invention, disturbance estimator 46 may be mathematically determined based on the formula for controller 28. Let H(z) be the transfer function for PI controller 28, as expressed in Equation 1:

$$H(z) = \frac{z - \alpha}{D(z)}, \quad (1)$$

where D(z) is a polynomial and $\alpha$ is a constant. Disturbance estimator 46 can then be mathematically represented by the function P(z) as in Equation 2:

$$P(z) = \frac{1 - \alpha}{D(z)}. \quad (2)$$

If controller 28 can be modeled as a proportional-integral (PI) controller, the integral term may be viewed as the best estimate at any given time of the equilibrium output required by controller 28 to reach a desired set-point. Thus the integral term is an appropriate signal to remove from controller output 24. For the case of a PI controller, this is equivalent to driving engine estimator 42 with the proportional term only. In the case of a Smith predictor, only higher bandwidth phase issues are effectively addressed. Thus, there will be no significant degradation to any performance improvements.

Additional techniques for implementing disturbance estimator 46 are also possible. For example, the estimated equilibrium controller output for a given disturbance, control input 24, may be removed by differentiating the controller output prior to feeding the controller output into engine estimator 42.

FIGS. 3–12 provide block diagrams and signal plots of simple control systems illustrating problems encountered with previous systems and the merits of the present control system.

Figure 3:
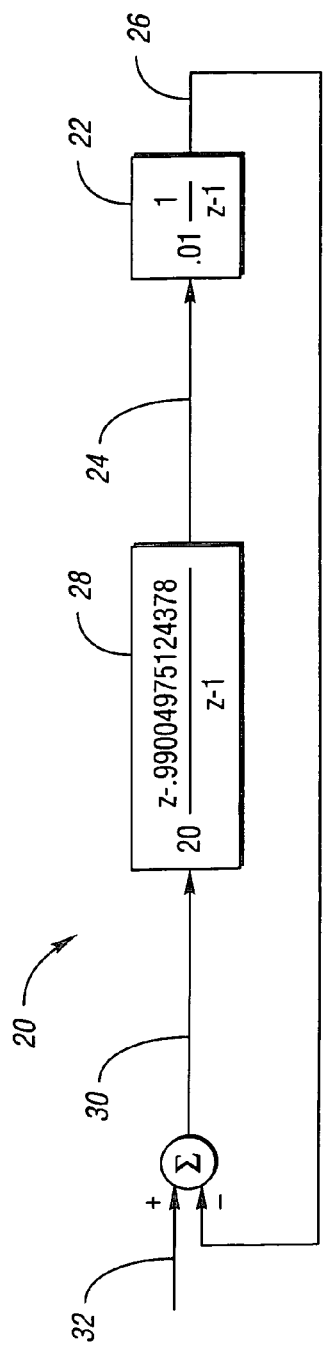
FIG. 3 is a block diagram of an exemplary engine control system without transport delay.

Referring now to FIG. 3, a block diagram of an exemplary engine control system without transport delay is shown. Control system 20 includes engine parameter 22 modeled as a first order Z-transform transfer function with inertia-based integration but without transport delay. Controlled output 26 is subtracted from desired input 32 to produce error signal 30. Controller 28 generates control input 24 based on error signal 30.

Figure 4:
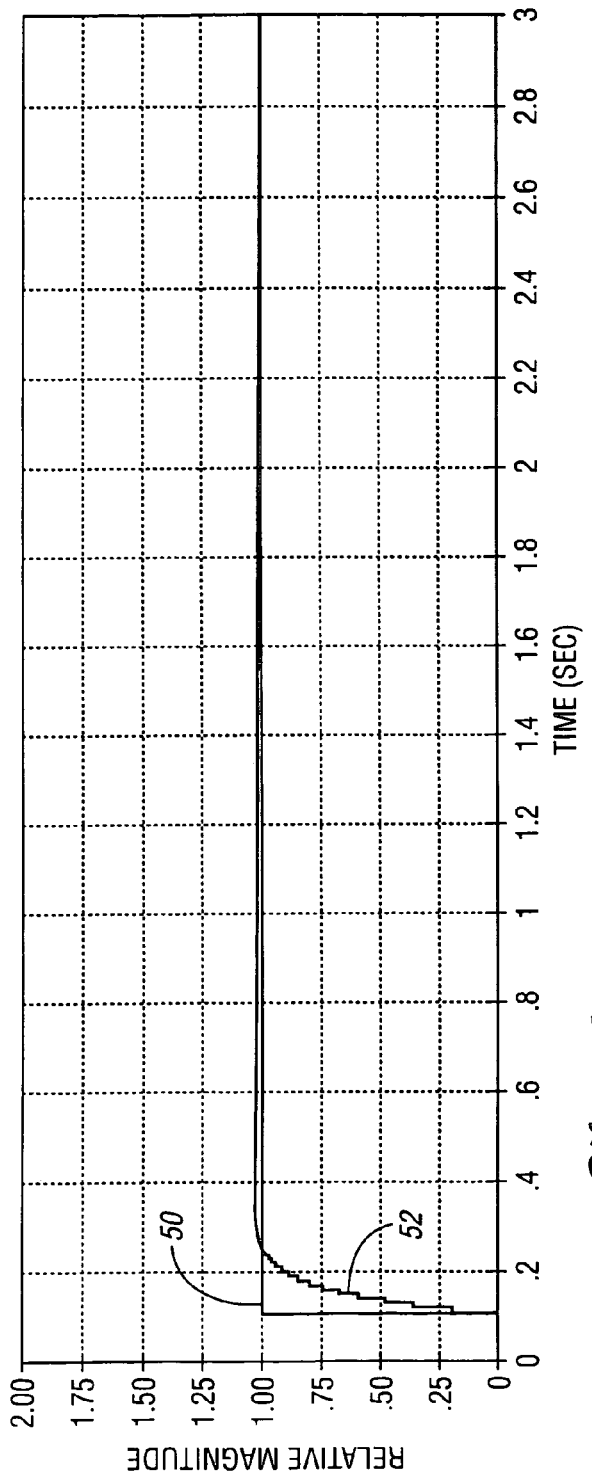
FIG. 4 is a graph of signals for the system modeled in FIG. 3.

Referring now to FIG. 4, a graph of signals for the system modeled in FIG. 3 is shown. Plot 50 represents a unit step input on desired input 32. Controller 28 has been designed such that controlled output 26 exhibits a slightly underdamped response with rapid settling time.

Figure 5:
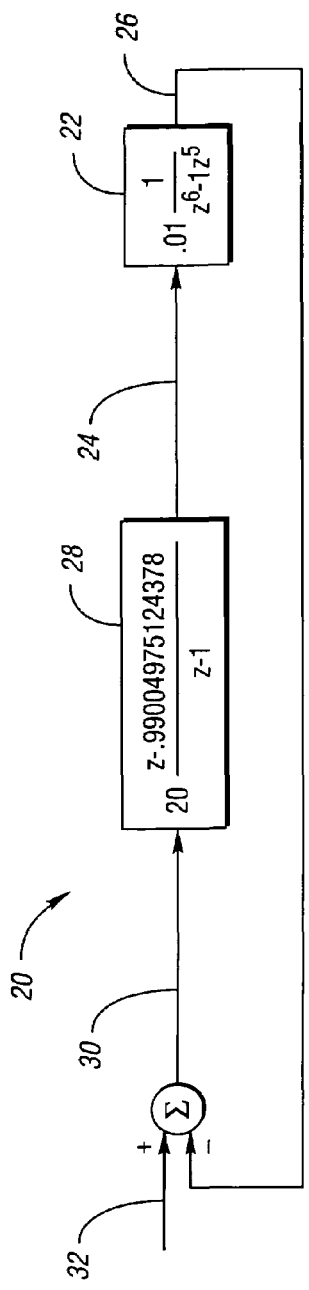
FIG. 5 is a block diagram of an exemplary engine control system with transport delay.

Referring now to FIG. 5, a block diagram of an exemplary engine control system with transport delay is shown. The transfer function for engine parameter 22 now includes the term $Z^{-5}$ representing a transport delay of five sampling periods.

Figure 6:
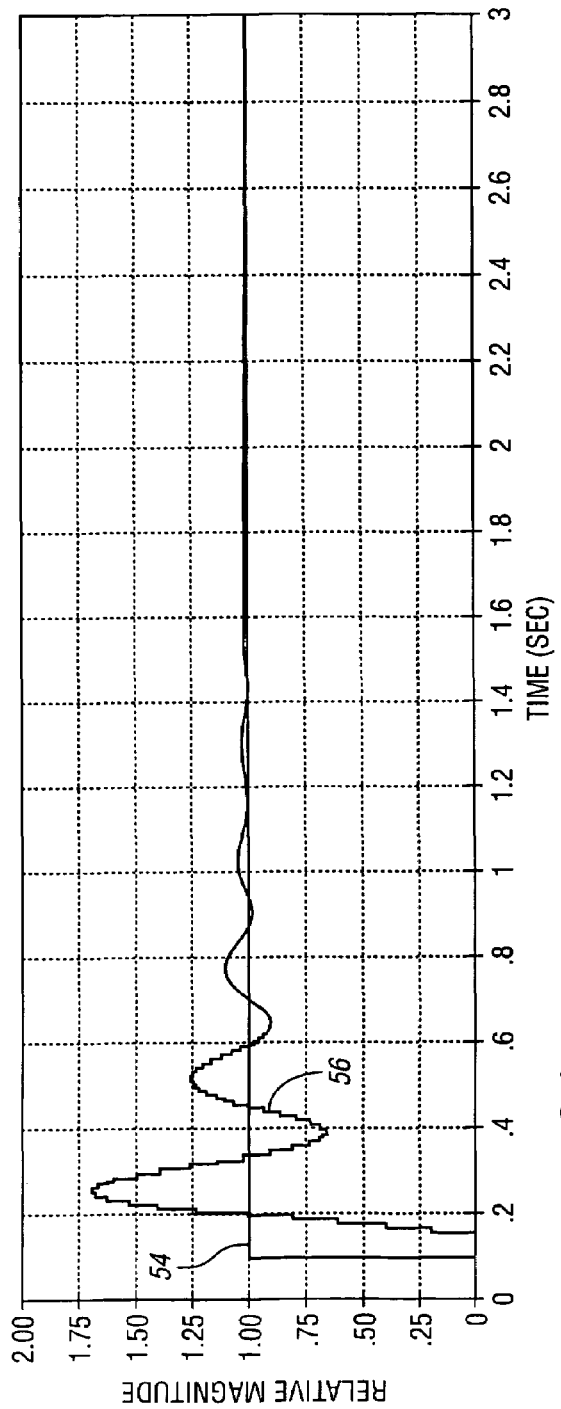
FIG. 6 is a graph of signals for the system modeled in FIG. 5.

Referring now to FIG. 6, a graph of signals for the system modeled in FIG. 5 is shown. Plot 54 is the unit step on desired input 32. The resulting signal on controlled output 26 is shown by plot 56. Controlled output 26 is now severely underdamped with a considerably longer settling time. The overshoot and increased settling time is due to the fact that controller 28 receives no feedback from engine parameter 22 for a given change in control signal 24 over five sampling periods. Hence, controller 28 continues to drive control input 24 with delayed information about the state of engine parameter 22.

Figure 7:
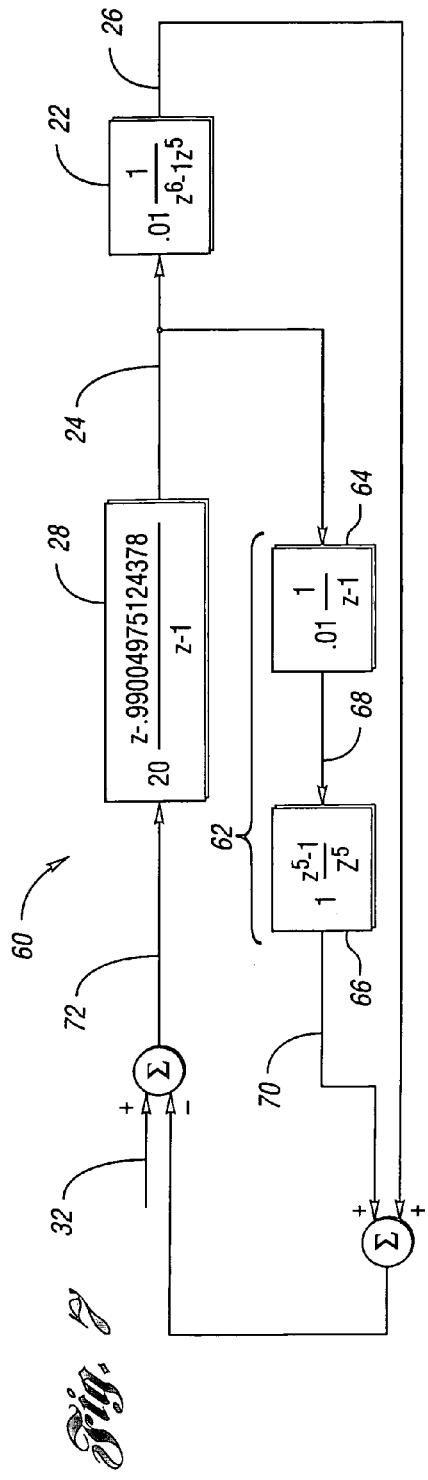
FIG. 7 is a block diagram of an exemplary engine control system with transport delay incorporating a Smith compensator.

Referring now to FIG. 7, a block diagram of an exemplary engine control system with transport delay incorporating a Smith compensator is shown. A control system, shown generally by 60, now includes Smith compensator 62. Smith compensator 62 includes delay-free engine model 64 accurately modeling engine parameter 22 without delay. Smith compensator 62 also includes delay differencer 66. Delay differencer 66 generates as compensator output 70 the difference between the current model output 68 and the model output 68 generated at a previous time equal to the delay in engine parameter 22. Error signal 72 is then the difference between desired input 32 and the sum of controlled output 26 and compensator output 70.

Figure 8:
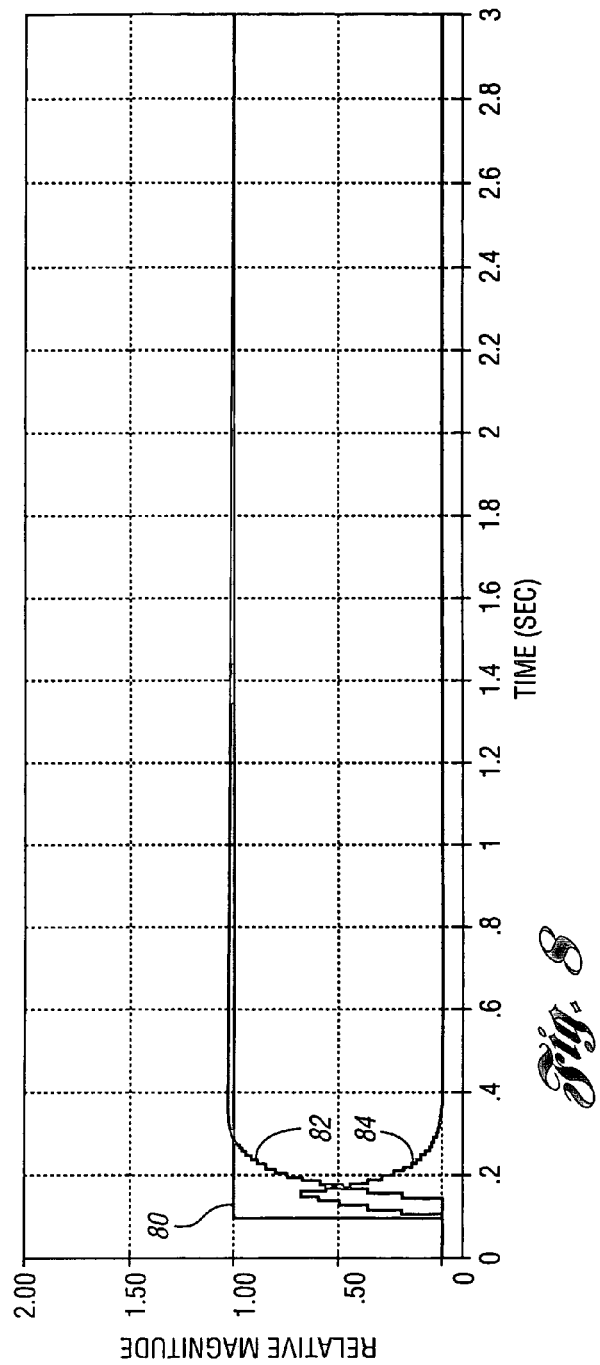
FIG. 8 is a graph of signals for the system modeled in FIG. 7.

Referring now to FIG. 8, a graph of signals for the system modeled in FIG. 7 is shown. Plot 80 illustrates a unit step input on desired input 32. Controlled output 26, shown by plot 82, tracks exactly the delay-free result originally obtained by controller 28. Plot 84 illustrates compensator output 70 required to achieve controlled output 26. This illustrates that Smith compensator 62 works in the special case wherein equilibrium output is zero. In other words, the equilibrium disturbance is zero and compensator 62 is compensating for dynamic disturbance only.

Figure 9:
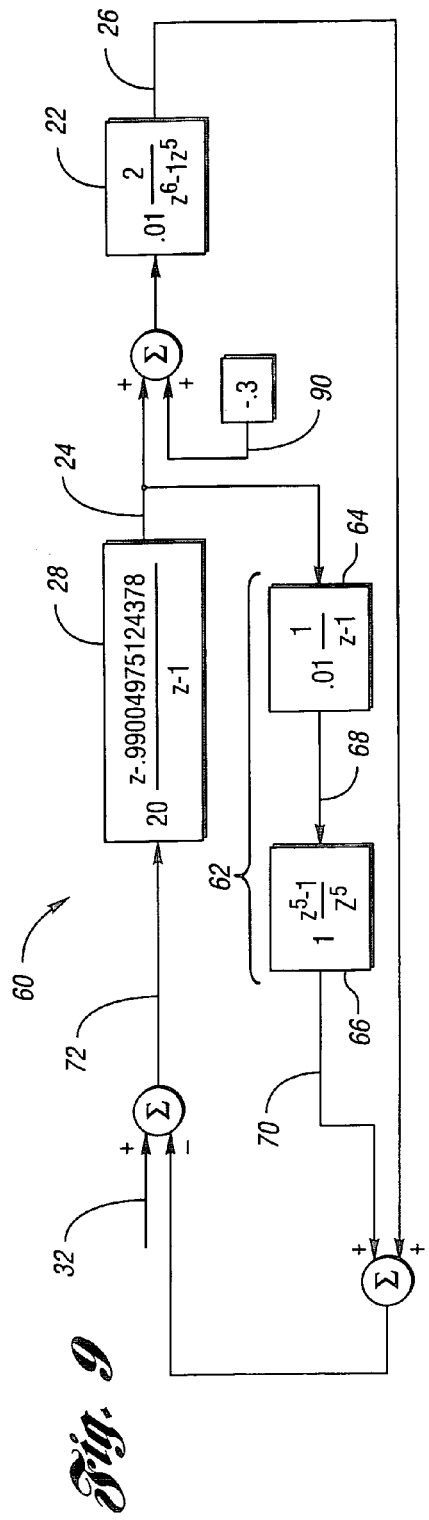
FIG. 9 is a block diagram of an exemplary engine control system with transport delay incorporating a Smith compensator with model errors.

Referring now to FIG. 9, a block diagram of an exemplary engine control system with transport delay incorporating a Smith compensator with model errors is shown. The open-loop gain for engine parameter 22 is now doubled. Hence, delay-free engine model 64 no longer correctly represents engine parameter 22. Also, engine parameter 22 is subject to constant disturbance input 90.

Figure 10:
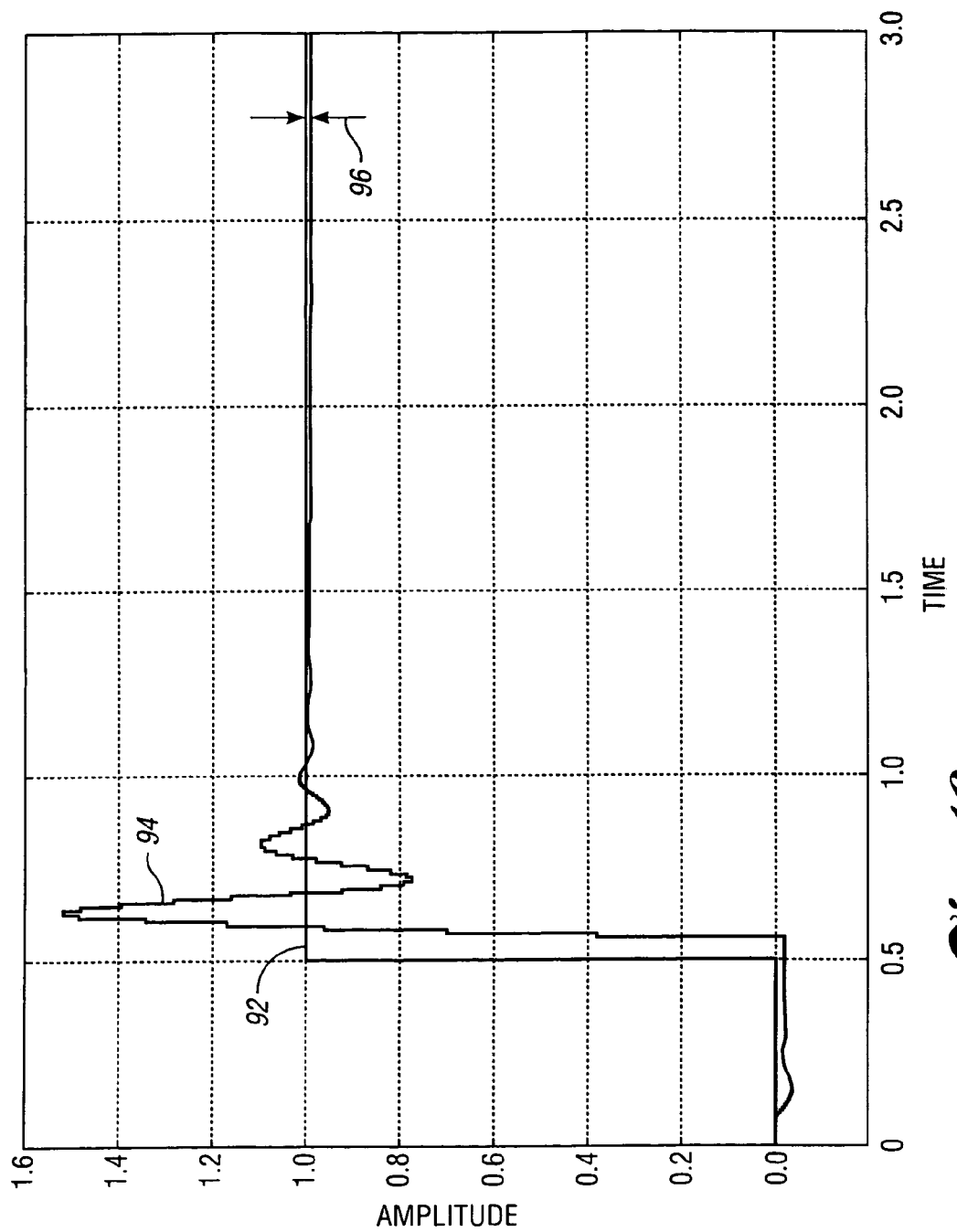
FIG. 10 is a graph of signals for the system modeled in FIG. 9.

Referring now to FIG. 10, a graph of signals for the system modeled by FIG. 9 is shown. Plot 92 is a unit step input on desired input 32. Controlled output 26, as indicated by plot 94, exhibits overshoot and a subsequent settling time prior to a steady-state value that is different from the unit step input by an error indicated as 96. This error is due to steady-state disturbance 90. In particular, controller 28 generates output 24 to counteract steady-state disturbance 90. Smith predictor 62 uses output 24 to estimate a set-point offset which itself is an equilibrium parameter. Thus, an equilibrium set-point error is established. It should be noted that even when not in equilibrium, engine model 42 will over-predict the actual plant response by an amount proportional to the disturbance.

Figure 11:
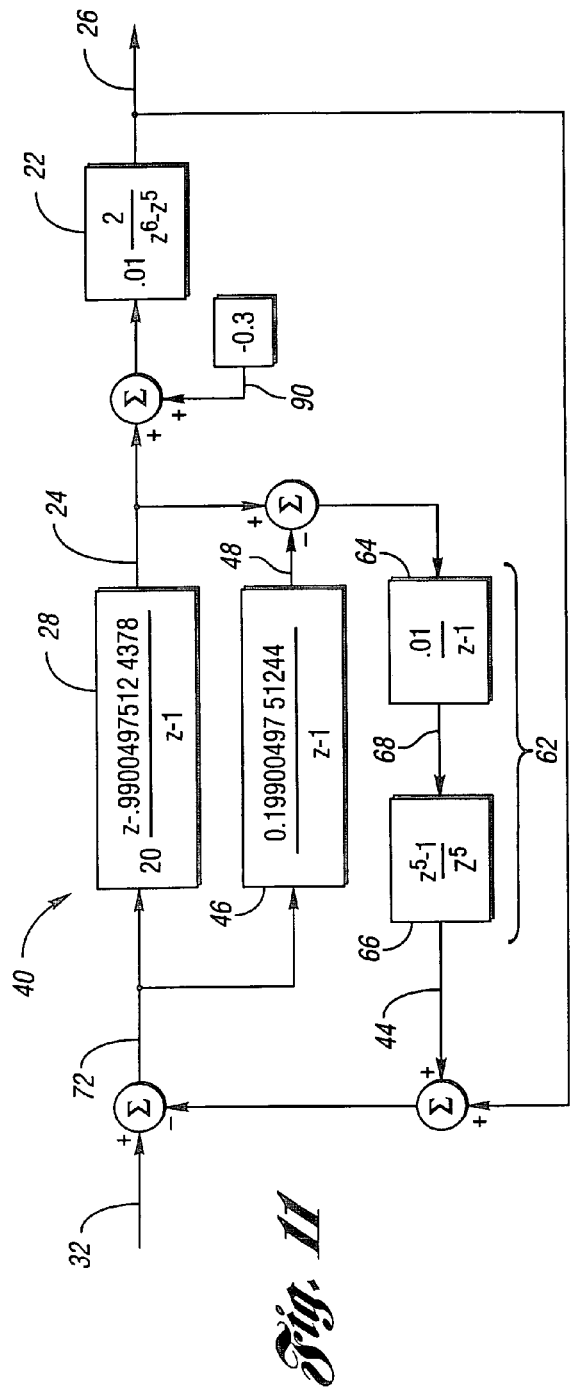
FIG. 11 is a block diagram of an exemplary engine control system with transport delay incorporating disturbance estimation according to an embodiment of the present invention.

Referring now to FIG. 11, a block diagram of an exemplary engine control system with disturbance estimation according to an embodiment of the present invention is shown. Disturbance estimator 46 generates equilibrium disturbance estimate 48, substantially removing the effects of steady-state disturbance 90 from the input of Smith predictor 62. The input to controller 28, error signal 30, is found by taking the difference between desired input 32 and the sum of controlled output 26 and the output of Smith predictor 62.

Figure 12:
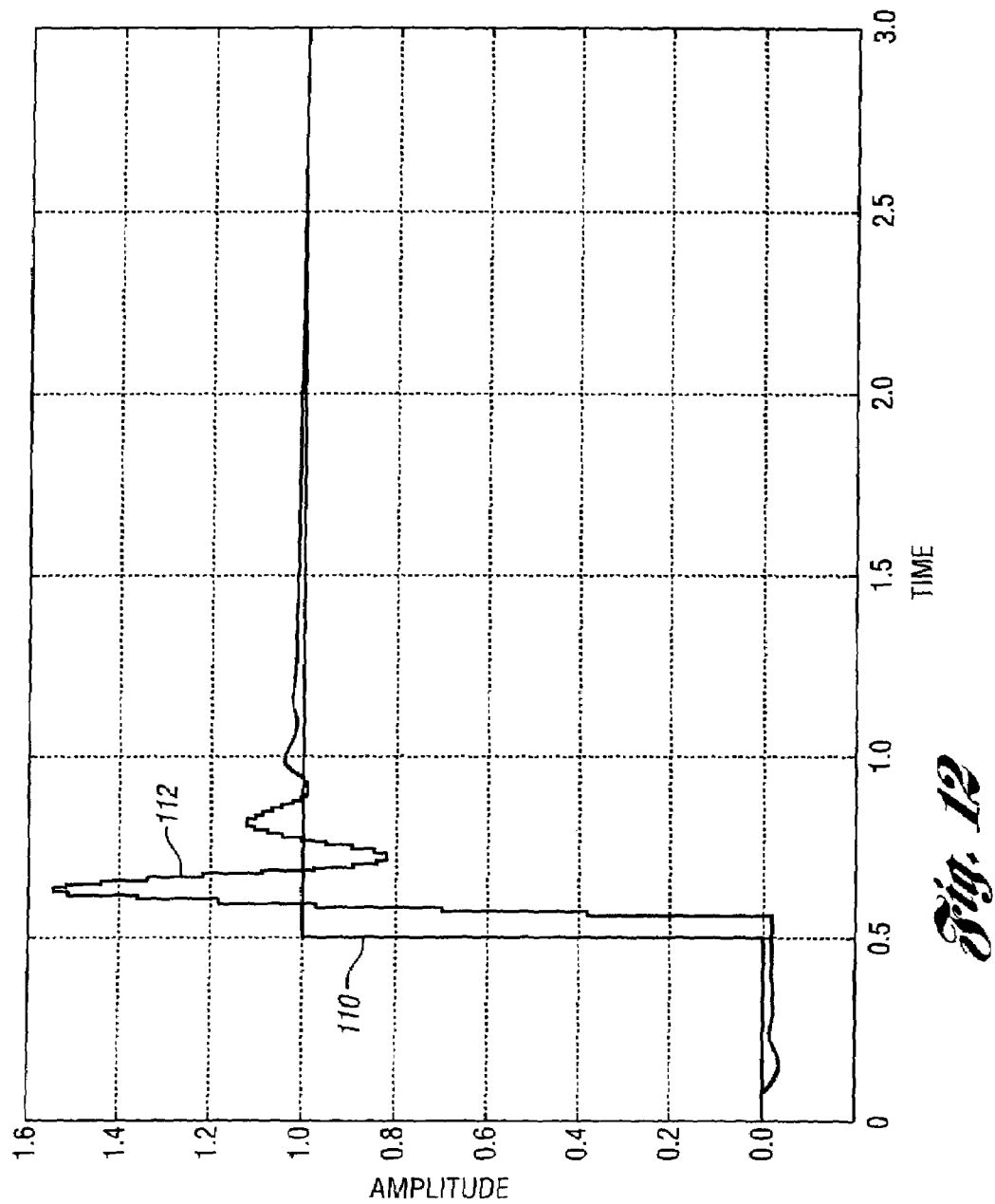
FIG. 12 is a graph of signals for the system modeled in FIG. 11.

Referring now to FIG. 12, a graph of signals for the system modeled in FIG. 11 is shown. Plot 110 illustrates a unit step input on desired input 32. Controlled output 26, shown by plot 112, closely tracks desired input 32 with a slight overshoot and minimal settling time.

Figure 13:
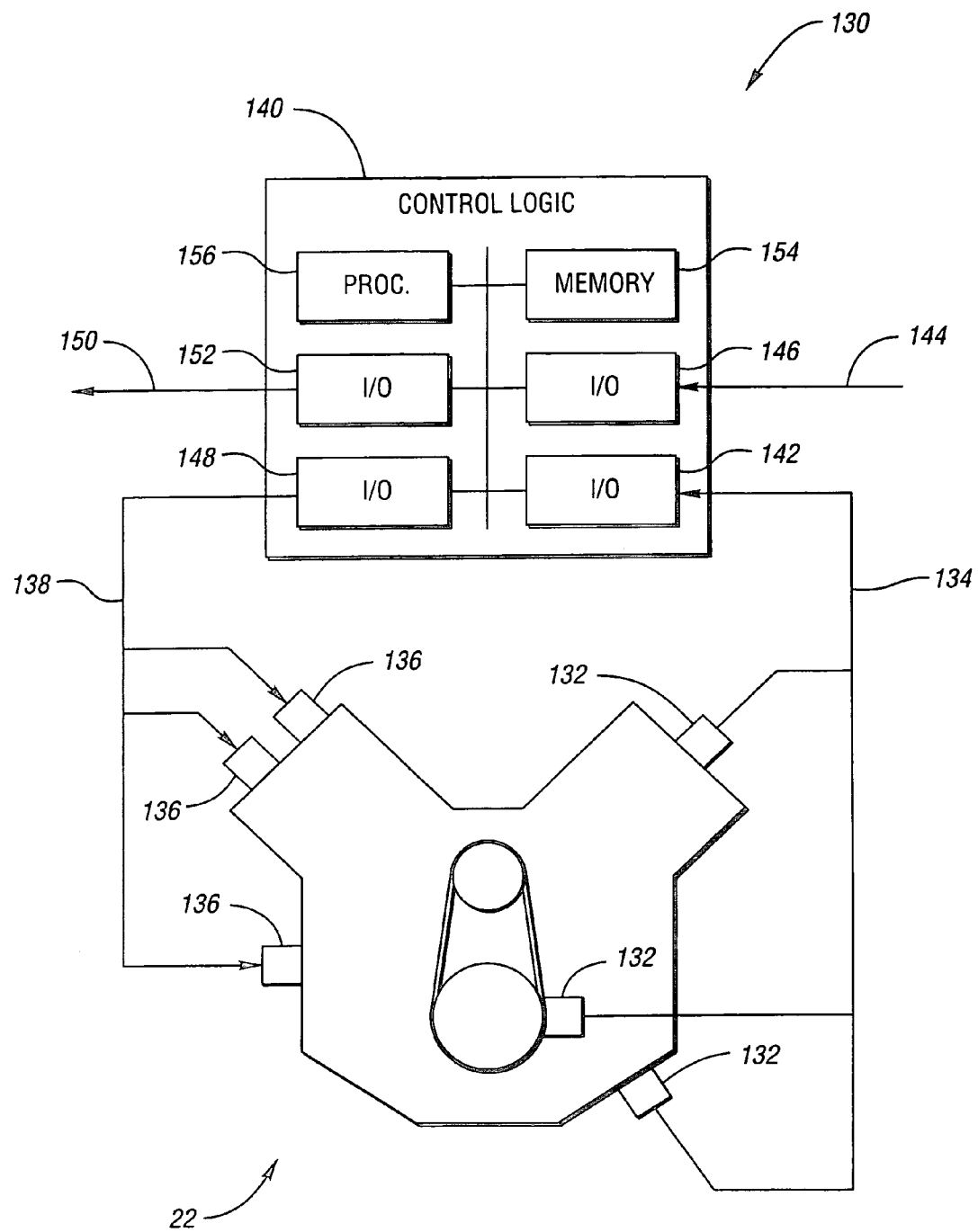
FIG. 13 is a schematic diagram of an engine with a control system according to an embodiment of the present invention.

Referring now to FIG. 13, a schematic diagram of an engine with a control system according to an embodiment of the present invention is shown. Engine 22 includes a control system, shown generally by 130, for controlling engine 22. Control system 130 includes one or more sensors 132 generating sensor signals 134 for directly or indirectly sensing at least one controlled output on engine 22. Control system 130 also includes one or more actuators 136 receiving control signals 138 for affecting one or more controlled output.

Control system 130 also includes control logic 140 implementing disturbance estimation. Input/output unit (I/O) 142 accepts sensor signals 134. Additional input signals 144, such as from other systems within a vehicle powered by engine 22 or by a person or computer providing control input for engine 22, may be received by input/output unit 146. Input/output unit 148 generates control signals 138. Additional output signals 150 may be generated by input/output unit 152 to control other systems within a vehicle powered by engine 22 or to provide status about engine 22. Memory 154 typically includes both volatile storage and non-volatile storage for holding engine calibration values, temporary calculation results, input and output values, executable code, and the like. Processor 156 executes code to read sensor signal values, calculate control signals based on an estimate of disturbances in engine 22, and output calculated control signals. While control logic 140 has been described as a conventional computer system, the present invention does not depend on the construction of control logic 140.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An internal combustion engine with transport delay, the engine having a plurality of controlled parameters, for at least one controlled parameter having a control input and a controlled output and experiencing a disturbance, the engine comprising:

a feed-forward control path driving the control input with a control signal, the feed-forward control path designed to provide closed-loop control of the controlled parameter without the presence of transport delay;

a disturbance estimator generating an estimate of the engine disturbance; and a Smith predictor generating a compensation signal based on the control signal and the engine disturbance estimate, the compensation signal providing an input to the feed-forward control path.

2. An internal combustion engine as in claim 1 wherein the control signal is based on an integral calculation.

3. An internal combustion engine as in claim 2 wherein the disturbance estimator generates the engine disturbance estimate based on the integral calculation.

4. An internal combustion engine as in claim 3 wherein the engine disturbance estimation is subtracted from the control signal to generate the Smith predictor input.

5. An internal combustion engine as in claim 1 wherein the control signal is generated by a proportional-integral controller in the feed-forward control path, the engine disturbance estimation is based on integral gain.

6. A control system for controlling an engine with transport delay, the engine having a control input and a controlled output, the engine subject to a disturbance, the system comprising:
   at least one sensor generating sensor signals from which the controlled output is delivered;
   at least one actuator receiving control signals for affecting the controlled output; and
   control logic in communication with the at least one sensor and the at least one actuator, the control logic operative to:
   (a) receive the sensor signals,
   (b) estimate the disturbance based on the received sensor signals,
   (c) generate a compensating signal based on a model for the engine and on the estimated disturbance, and
   (d) generate the control signals based on the compensating signal, sensor signals and a desired input.

7. A control system for controlling an engine as in claim 6 wherein the engine model is implemented in a Smith predictor.

8. A control system for controlling an engine as in claim 6 wherein the control logic generates the disturbance estimate based on an error signal found as a difference between the desired input and a combination of the controlled output and the engine model output.

9. A control system for controlling an engine with a disturbance, the engine having a delay between a control input and a controlled output, the control system, comprising:
   a Smith predictor generating a compensating signal based on the control input corrected for the disturbance; and
   a disturbance estimator generating an estimate of the disturbance based on the compensating signal, the disturbance estimate used to correct the control input for the disturbance.

10. A control system for controlling an engine as in claim 9 further comprising a controller generating the control input based on the controlled output, the compensating signal, and a desired input.

11. A control system for controlling an engine as in claim 10 wherein the controller comprises an integral calculation, the disturbance estimator generating the disturbance estimate based on the integral calculation.

12. A method for controlling an engine with transport delay, the engine having a control input and a controlled output, the engine subject to a disturbance, the method comprising:
   generating a control signal for the control input, the control signal determined to control the engine as if the engine was without the delay, the control signal based on an error signal;
   estimating the disturbance;
   generating a compensating signal based on a model for the engine and based on the estimated disturbance; and
   generating the error signal as a difference between a desired input and a sum of the controlled output and the compensation signal.

13. A method for controlling an engine as in claim 12 wherein generating a compensating signal comprises:
   generating a disturbance corrected signal by subtracting the estimated disturbance from the control signal; and
   generating the compensating signal by passing the disturbance corrected signal through an engine model for the engine.

14. A method for controlling an engine as in claim 5 wherein the engine model comprises a Smith predictor.

15. A method for controlling an engine as in claim 12 wherein generating the control signal comprises an integral calculation.

16. A method for controlling an engine as in claim 15 wherein the disturbance is estimated based on the integral calculation.

* * * * *